(12) United States Patent
Sharma et al.

(10) Patent No.: US 10,001,924 B2
(45) Date of Patent: Jun. 19, 2018

(54) EFFICIENT AND DYNAMICALLY SIZED REVERSE MAP TO HANDLE VARIABLE SIZE DATA

(71) Applicant: HGST Netherlands B.V., Amsterdam (NL)

(72) Inventors: Sandeep Sharma, Karnataka (IN); Saurabh Manchanda, Delhi (IN)

(73) Assignee: HGST NETHERLANDS B.V., Amsterdam (NL)

( * ) Notice: Subject to any disclaimer, the term of this patent is extended or adjusted under 35 U.S.C. 154(b) by 207 days.

(21) Appl. No.: 15/062,456

(22) Filed: Mar. 7, 2016

(65) Prior Publication Data
US 2017/0255388 A1 Sep. 7, 2017

(51) Int. Cl.
*G06F 3/06* (2006.01)
*G06F 12/10* (2016.01)

(52) U.S. Cl.
CPC .......... *G06F 3/0605* (2013.01); *G06F 3/064* (2013.01); *G06F 3/0608* (2013.01); *G06F 3/0631* (2013.01); *G06F 3/0679* (2013.01); *G06F 12/10* (2013.01); *G06F 2212/1044* (2013.01); *G06F 2212/214* (2013.01); *G06F 2212/401* (2013.01); *G06F 2212/7201* (2013.01)

(58) Field of Classification Search
CPC .... G06F 3/0605; G06F 3/0608; G06F 3/0631; G06F 3/064; G06F 3/0679; G06F 12/10; G06F 2212/1044; G06F 2212/214; G06F 2212/401; G06F 2212/7201
See application file for complete search history.

(56) References Cited

U.S. PATENT DOCUMENTS

| 6,112,286 | A * | 8/2000 | Schimmel | G06F 12/1018 711/203 |
|---|---|---|---|---|
| 7,822,927 | B1 * | 10/2010 | Scheer | G06F 12/0866 711/216 |
| 8,443,167 | B1 | 5/2013 | Fallone et al. | |
| 8,719,501 | B2 | 5/2014 | Flynn et al. | |
| 8,874,833 | B1 | 10/2014 | Gole | |
| 8,924,636 | B2 | 12/2014 | Hirao et al. | |
| 9,026,767 | B2 | 5/2015 | Schaefer et al. | |
| 9,098,400 | B2 | 8/2015 | El Maghraoui et al. | |

(Continued)

OTHER PUBLICATIONS

Gao, Yuan et al.; A Novel Hybrid Address Mapping Strategy of NAND Flash; dated Sep. 2014; 2 pages; IEEE Xplore Digital Library.

*Primary Examiner* — Aracelis Ruiz
(74) *Attorney, Agent, or Firm* — Patent Law Works LLP

(57) ABSTRACT

A system comprising a processor and a memory storing instructions that, when executed, cause the system to receive a data stream including one or more data blocks; determine a size of the one or more data blocks; determine a number of mappings needed for a physical block based on the size of a data block and a size of the physical block, the number of mappings being variable for different physical blocks depending on the size of the one or more data blocks storing in the physical block; retrieve a dynamically sized reverse map, the dynamically sized reverse map being a dynamic tree structure; determine a starting location in the dynamically sized reverse map for mappings of the one or more data blocks; and create an entry for the physical block in the dynamically sized reverse map.

18 Claims, 9 Drawing Sheets

(56) References Cited

U.S. PATENT DOCUMENTS

2006/0294339 A1   12/2006  Trika et al.
2015/0019830 A1*  1/2015  Park ..................... G06F 3/0659
                                                                 711/165

* cited by examiner

EFFICIENT AND DYNAMICALLY SIZED REVERSE MAP TO HANDLE VARIABLE SIZE DATA

BACKGROUND

The present disclosure relates to managing sets of data blocks in a storage device. In particular, the present disclosure describes a variable sized reverse map for a storage application. Still more particularly, the present disclosure relates to an efficient and dynamically sized reverse map to handle variable sized data.

Many storage device systems use a dynamic translation table that keeps track of latest mappings from logical to physical media. As and when logical blocks are overwritten, the translation table is updated to point to a new location in the physical media and the old physical media location is reclaimed by the garbage collection process. The garbage collection process works on the contiguous ranges of locations in the physical media, therefore, this process requires the reverse mapping of locations from physical media to logical block address.

With the storage devices supporting data reduction, one physical block can store multiple logical blocks in reduced form. Therefore, there is no one to one relation between the physical block size and the number of logical blocks that can be stored in the storage devices. The size of the reverse map in such systems needs to be dynamic, and preferably depends on the work load. For example if the physical block size is 4096 bytes, with 8× compression the smallest addressable unit becomes of size 512 bytes and simply extending the reverse map to address 512 bytes blocks will have 8× larger memory consumption. The reverse translation table is implemented as paged translation table to constrain the memory consumption, so a larger reverse map is going to consume more space in the physical media. The memory footprint of the system software and the overall efficiency of the garbage collection process are highly dependent on the reverse map implementation.

SUMMARY

The present disclosure relates to systems and methods for hardware efficient data management. According to one innovative aspect of the subject matter in this disclosure, a system includes a dynamically sized reverse map having a variable size corresponding to a variable number of mappings for different physical blocks because of compression performed by a storage device; and a processor coupled to the dynamically sized reverse map, the processor configured to: receive a data stream including one or more data blocks; determine a size of the one or more data blocks; determine a number of mappings needed for a physical block based on the size of a data block and a size of the physical block, the number of mappings being variable for different physical blocks depending on the size of the one or more data blocks storing in the physical block; determine a starting location in the dynamically sized reverse map for mappings of the one or more data blocks; and create an entry for the physical block in the dynamically sized reverse map, the entry including the number of mappings of the physical block and the starting location for the one or more data blocks, the entry being an index of the variable numbers of mappings for the physical block.

In general, another innovative aspect of the subject matter described in this disclosure may be implemented in methods that include: receiving a data stream including one or more data blocks; determining a size of the one or more data blocks; determining a number of mappings based on the size of the one or more data blocks and a size of a physical block, the number of mappings being variable for different physical blocks depending on the size of the one or more data blocks stored in the physical block; retrieving a dynamically sized reverse map, a size of the dynamically sized reverse map corresponding to the variable number of mappings for different physical blocks; determining a starting location in the dynamically sized reverse map for mappings of the one or more data blocks; and creating an entry for the physical block in the dynamically sized reverse map, the entry including the number of mappings of the physical block and the starting location for the one or more data blocks, the entry being an index of the numbers of mappings for the physical block.

Other implementations of one or more of these aspects include corresponding systems, apparatus, and computer programs, configured to perform the actions of the methods, encoded on computer storage devices.

These and other implementations may each optionally include one or more of the following features. For instance, features include where the dynamically sized reverse map includes a dynamic tree structure having an extensible node for a plurality of buffer entries, one buffer entry for each of the one or more data blocks; the operations include creating a buffer entry for each of the one or more data blocks, the buffer entry including a logical block number, a physical block number, a starting sector in the physical block, and a number of sectors occupied in the physical block; the buffer entry is persisted to the storage device; the number of sectors occupied in the physical block is determined based on the size of each of the one or more data blocks and a size of the sector; the number of mappings of the physical block represents the number of buffer entries a physical block consumes; and the map segment stores the dynamically sized reverse map with the forward pointer and the number of references.

For instance, the operations further include: receiving a request to copy a plurality of data blocks from a first range of logical address to a second range of logical address; determining a size of the plurality of data blocks; determining number of references the plurality of data blocks occupy based on the size of the plurality of data blocks; determining a forward pointer based on the dynamically sized reverse map for the plurality of data blocks; and updating the dynamically sized reverse map with an extra entry with the forward pointer and the number of references.

For instance, the operations further include: retrieving information of a map segment from a segment header; determining a use count of write blocks of the map segment; determining whether the map segment satisfies dynamically sized reverse map updating criteria based on the use count of the map segment; responsive to the map segment satisfying the dynamically sized reverse map updating criteria, performing dynamically sized reverse map updating on the map segment; and updating the information of the map segment in the segment header.

These implementations are particularly advantageous in a number of respects. For instance, the technology describes herein provides a dynamically sized reverse map for efficient data storage in systems supporting data reduction. Further the dynamically sized reverse map is scalable and supports block copy operations.

It should be understood that language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Systems and methods for implementing a dynamically sized reverse map architecture are described below. In particular, in the present disclosure, systems, and methods for implementing a dynamically sized reverse map in storage devices and specifically in flash-storage devices with compression are described below. While the systems and methods of the present disclosure are described in the context of a particular system architecture that uses flash-storage, it should be understood that the systems and methods can be applied to other architectures and organizations of hardware and other memory devices with similar properties.

The present disclosure relates to implementing a dynamically sized reverse map in storage devices for a write process, a garbage collection process, and a block copy process. In some embodiments, the present disclosure describes the dynamically sized reverse map layout for storage applications. The present disclosure distinguishes from prior implementations by solving the various problems. For example, as the storage capacity of storage devices continuously increase, the sizes of the dynamic translation table and reverse map grow correspondingly. At the same time, data reduction techniques are applied in the memory management field to store more data in the same storage devices, which leads to even bigger translation table in the storage devices. Furthermore, due to variable data compression ratios used in the data reduction techniques, it requires a variable sized translation table. Therefore, the workload-based reverse map described below is very desirable in the storage industry. Also, Garbage Collection (GC) is a typical technique deployed in memory management. Garbage Collection reclaims memory that was occupied by objects that are no longer in use. The mechanism of Garbage Collection works on contiguous ranges of locations in storage media. Therefore, a reverse map (reverse translation table) from physical media to logical block address is required. Thus, the present disclosure solves the problems associated with efficient data storage by providing a highly workload-based reverse map for implementing storage applications in the storage device.

System

Figure 1:
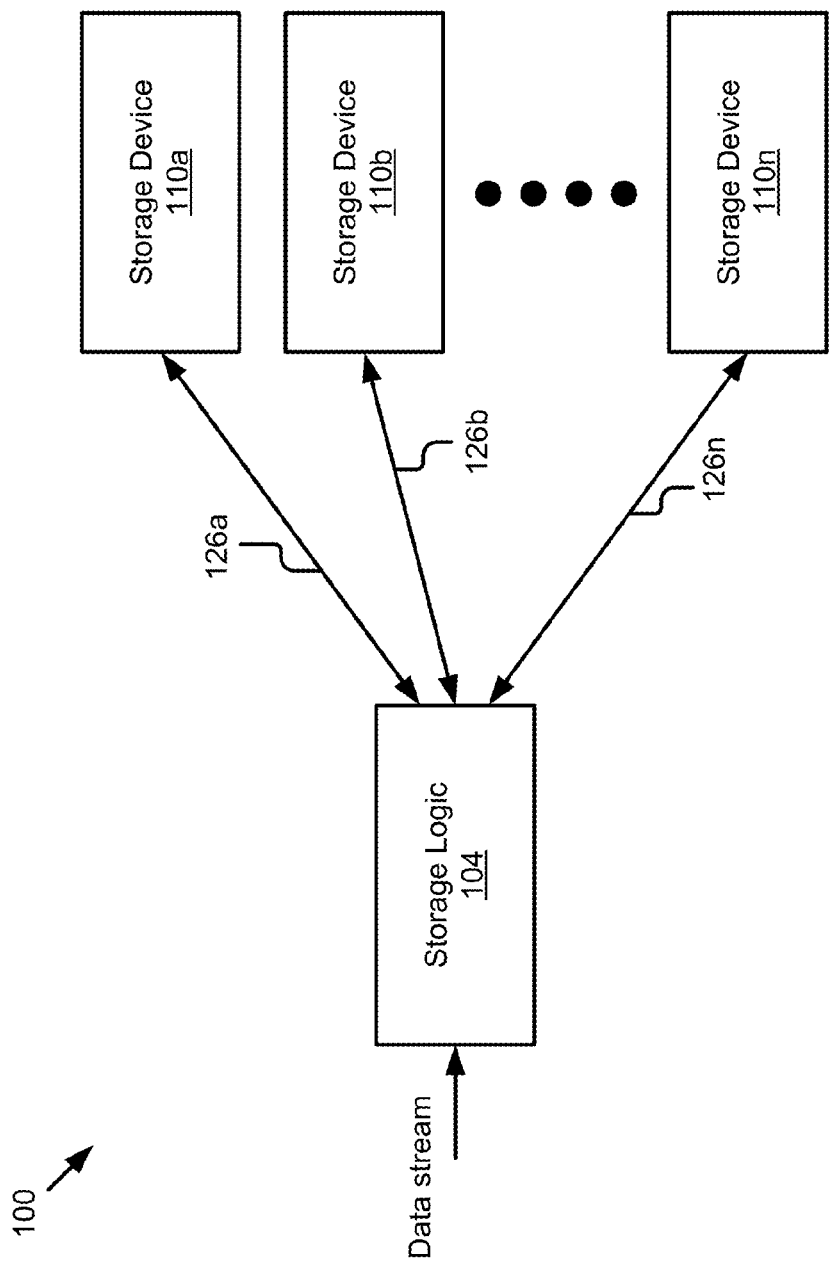
FIG. 1 is a high-level block diagram illustrating an example system for implementing a dynamically sized reverse map in a storage system according to the techniques described herein.

FIG. 1 is a high-level block diagram illustrating an example system 100 implementing a dynamically sized reverse map in a storage device according to the techniques described herein. In the depicted embodiment, the system 100 may include storage logic 104, and one or more storage devices or storage media 110a, 110b through 110n. It should be noted that the terms "storage media" and the "storage device" are used interchangeable throughout the present disclosure to refer to the physical media upon which the data is stored. In the illustrated embodiment, the storage logic 104 and the one or more storage devices 110a, 110b through 110n are communicatively coupled via signal lines 126a, 126b through 126n. However, the present disclosure is not limited to this configuration and a variety of different system environments and configurations can be deployed and are within the scope of the present disclosure. Other embodiments may include additional or fewer components. It should be recognized that FIG. 1 as well as the other figures used to illustrate an embodiment, and an indication of a letter after a reference number or numeral, for example, "110a" is a specific reference to the element or component that is designated by that particular reference numeral. In the event a reference numeral appears in the text without a letter following it, for example, "110," it should be recognized that such is a general reference to different embodiments of the element or component bearing that general reference numeral.

In some embodiments, the storage logic 104 implements a dynamically sized reverse map as well as store-related operations in storage devices. The storage logic 104 can provide computing functionalities, services, and/or resources to send, receive, read, write, and transform data from other entities of system 100. In some embodiments, the storage logic 104 can be a computing device configured to make a portion or all of the storage space available on storage devices 110. The storage logic 104 is coupled to the storage devices 110 via signal line 216 for communication and cooperation with the storage devices 110a-110n of the system 110. In other embodiments, the storage logic 104 transmits data between the storage devices 110a-110n via the signal lines 126a-126n. It should be recognized that multiple storage logic units 104 can be utilized, either in a distributed architecture or otherwise. For the purpose of this application, the system configuration and operations performed by the system 100 are described in the context of a single storage logic 104.

The storage devices 110a, 110b through 110n, may include a non-transitory computer-usable (e.g., readable, writeable, etc.) medium, which can be any non-transitory apparatus or device that can contain, store, communicate, propagate or transport instructions, data, computer programs, software, code routines, etc., for processing by or in connection with a processor. In some embodiments, the storage devices 110a, 110b through 110n communicate and cooperate with the storage logic 104 via signal lines 126a, 126b through 126n. While the present disclosure reference to the storage devices 110 as flash memory, it should be understood that in some embodiments, the storage devices 110 may include other non-volatile memory devices with similar characteristics.

Figure 2:
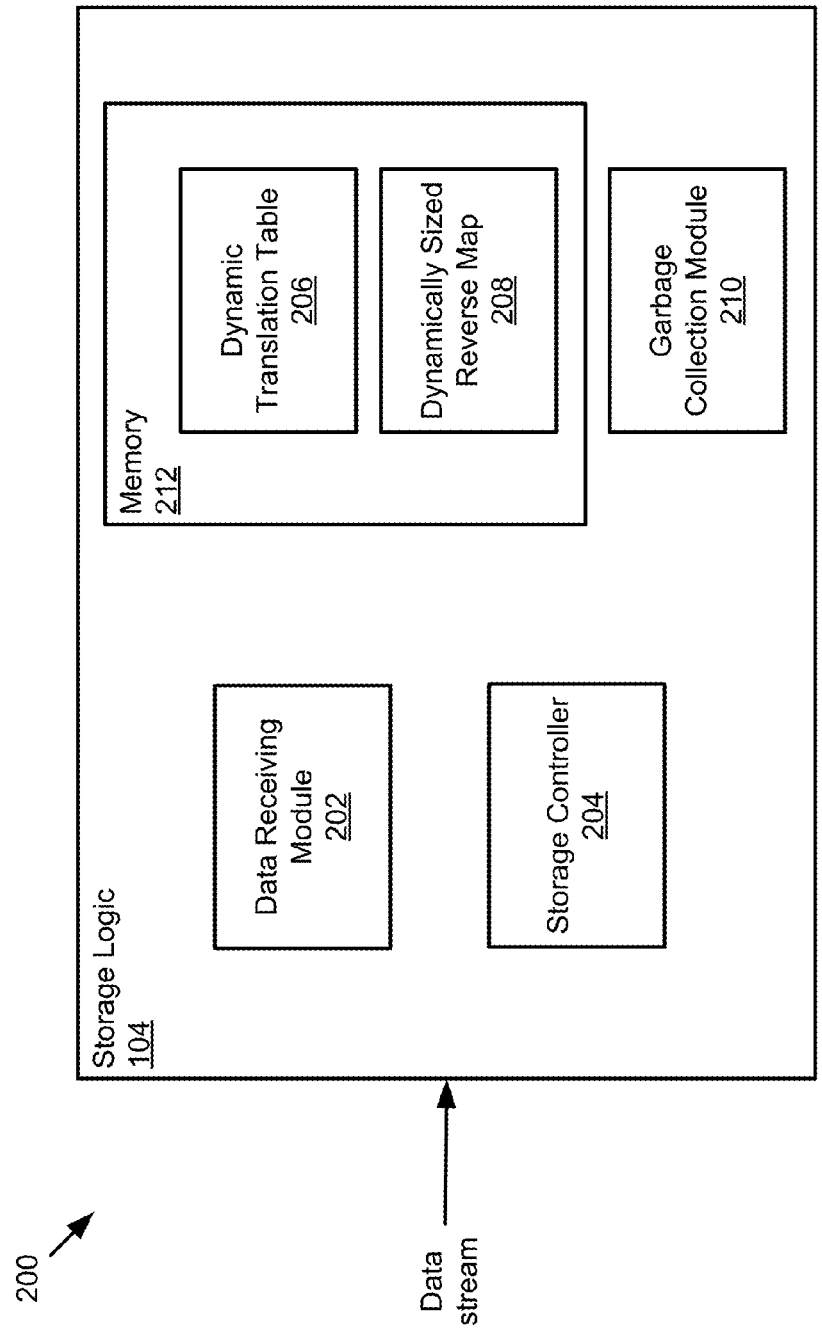
FIG. 2 is a block diagram illustrating an example of storage logic according to the techniques described herein.

FIG. 2 is a block diagram illustrating an example of storage logic 104 according to the techniques described herein. The storage logic 104 is combinational logic, firmware, software, code, or routines or some combination thereof for implementing the dynamically sized reverse map for storage devices 110. As depicted in FIG. 2, the storage logic 104 may include a data receiving module 202, a storage controller 204, a memory 212, and a garbage collection module 210, which may be electronically communicatively coupled by a communication bus (not shown) for cooperation and communication with each other. The memory 212 may further include a dynamic translation table 206 and a dynamically sized reverse map 208. There components 202, 204, 206, 208, 210, and 212 are also coupled for communication with other entities (e.g., storage devices 110) of the system 100 via signal lines 126. However, the present disclosure is not limited to this configuration and a variety of different system environments and configurations can be deployed and are within the scope of the present disclosure. Other embodiments may include additional or fewer components.

In one embodiment, the data receiving module 202, the storage controller 204, the memory 212, and the garbage collection module 210 are hardware for performing the operations described below. In some embodiments, the data receiving module 202, the storage controller 204, the memory 212, and the garbage collection module 210 are sets of instructions executable by a processor or logic included in one or more customized processors, to provide its respective functionalities. In some embodiments, the data receiving module 202, the storage controller 204, the memory 212, and the garbage collection module 210 are stored in a storage apparatus and are accessible and executable by a processor to provide its respective functionalities. In further embodiments, the data receiving module 202, the storage controller 204, the memory 212, and the garbage collection module 210 are adapted for cooperation and communication with a processor and other components of the system 100. The particular naming and division of the units, modules, routines, features, attributes, methodologies and other aspects are not mandatory or significant, and the mechanisms that implement the present disclosure or its features may have different names, divisions, and/or formats.

The data receiving module 202 is a buffer and software, code or routines for receiving data and/or commands from one or more devices and/or retrieving data. In one embodiment, the data receiving module 202 receives a data stream (data packets) from one or more devices and prepares them for storage in a non-volatile storage device (e.g., storage devices 110). In some embodiments, the data receiving module 202 receives incoming data packets and temporally stores the data packets into a memory buffer (which may or may not be part of the memory 212).

The data receiving module 202 receives incoming data and/or retrieves data from one or more data stores such as, but not limited to, memory 212 and storage devices 110 of the system 100. Incoming data may include, but is not limited to, a data stream and/or a command. The data stream may include a set of data blocks (e.g., current data blocks of a new data stream, existing data blocks from storage, etc.).

The set of data blocks (e.g. of the data stream) can be associated with but are not limited to, documents, files, e-mails, messages, blogs, and/or any applications executed and rendered by a customized processor and/or stored in memory. The command may include, but not limited to, a write operation request associated with current data blocks of a new data stream, for example, a write command. In some embodiments, the data receiving module 202 may transmit the command to the storage controller 204 for execution.

The storage controller 204 is software, code, logic, or routines for providing efficient data management. The storage controller 204 may be electronically communicatively coupled by a communication bus (not shown) for cooperation and communication with other components of the storage logic 104. In some embodiments, the storage controller 204 is a processor. The storage controller 204 may receive data blocks from the data receiving module 202 and other data from the retrieve dynamic translation table 206 and/or dynamically sized reverse map 208 from memory 212. In some embodiments, the storage controller 204 may perform efficient data management in the storage logic 104, such as implementing a dynamically sized reverse map 208 for write process, garbage collection process, and block copy process, etc. The processes of efficient data management performed by the storage controller 204 are described in detail below with reference to FIGS. 5-8.

The memory 212 may also store instructions and/or data that may be executed by a customized processor (e.g., the storage controller 204). In the illustrated embodiment, the memory 212 may include a dynamic translation table 206 and a dynamically sized reverse map 208. The memory 212 is coupled to a bus (not shown) for communication with the other components of the storage logic 104. The instructions and/or data stored in the memory 212 may include code for performing the techniques described herein. The memory 212 may be, for example, non-transitory memory such as a dynamic random access memory (DRAM) device, a static random access memory (SRAM) device, or other volatile memory devices.

The dynamic translation table 206 is a table with a translation structure that maps a logical address to a physical address. In some embodiments, the dynamic translation table 206 may be stored in the memory 212 and retrieved by the storage controller 204 when needed. It should be recognized that the dynamic translation table 206 may be stored in other storage units as well, such as the storage devices 110. In some embodiments, the dynamic translation table 206 may update simultaneously with the data store operations to keep track of the latest translation from logical address to physical address. In the illustrated embodiments, the dynamic translation table 206 is used by the storage controller 204 for writing data blocks to the storage devices 110, erasing data blocks from the storage devices 110, etc. The dynamic translation table 206 may also be updated by the storage controller 204 when the write process is complete and used in the garbage collection process as described below.

The dynamically sized reverse map 208 is a map with a translation structure that maps a physical address to a logical address. In some embodiments, the dynamically sized reverse map 208 may be stored in the memory 212 and retrieved by the storage controller 204 when needed. It should be recognized that the dynamically sized reverse map 208 may be stored in other storage units as well, such as the storage devices 110. In some embodiments, the dynamically sized reverse map 208 is updated simultaneously with data store operations to keep track of the latest translation from physical address to logical address. In the illustrated embodiments, the dynamically sized reverse map 208 is used by the storage controller 204 when writing data blocks to the storage devices 110, and in garbage collection as described below. The dynamically sized reverse map 208 may also be updated by the storage controller 204 when the write process is complete. The layout of the reverse map 208 is described in detail below with reference to FIG. 3.

The garbage collection module 210 is software, code, logic, or routines for performing garbage collection on the storage devices 110. The garbage collection module 210 may be electronically communicatively coupled by a communication bus (not shown) for cooperation and communication with other components of the storage logic 104. The garbage collection module 210 performs data garbage collection periodically on the storage devices 110 of the system 100. The garbage collection module 210 may refer to the dynamically sized reverse map 208 in deciding whether a data block is valid and requires relocation. The mechanism is comparing two entries in the dynamic translation table 206 and the dynamically sized reverse map 208 for this data block; if the physical block is found to be the same in both maps, then the data block is determined to be valid and requiring relocation in the garbage collection process.

The garbage collection module 210 may perform dynamically sized reverse map updating for a map segment (e.g., garbage collection to the dynamically sized reverse map 208). The timing for determining whether to perform dynamically sized reverse map updating can be varied and defined based on need. In some embodiments, the garbage collection module 210 may determine whether to perform garbage collection on the dynamically sized reverse map segment periodically. In other embodiments, the garbage collection module 210 may determine whether to perform garbage collection on the dynamically sized reverse map segment responsive to the completion of the data garbage collection. In the illustrative embodiment, the garbage collection module 210 may retrieve information of a map segment from a segment header.

Figure 3:
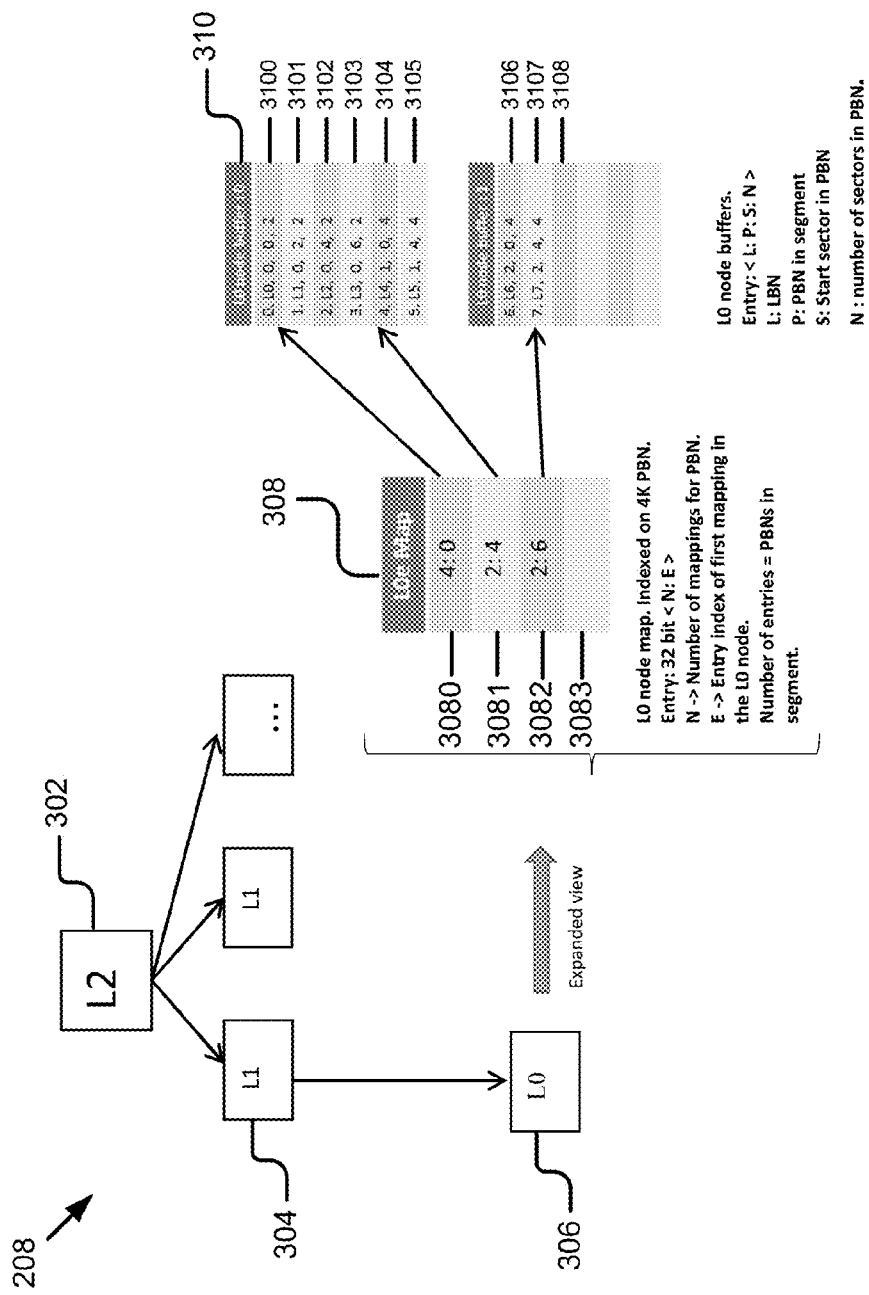
FIG. 3 is an example graphical representation illustrating a dynamically sized reverse map layout used by the storage logic according to the techniques described herein.

For the illustrated purpose only, it should be understood that a segment is a fixed range of contiguous physical blocks on the storage media 110 which are filled sequentially and erased together. A map segment may be a special segment(s) that stores a dynamic translation table 206 and a dynamically sized reverse map 208. In the tree structure of the dynamically sized reverse map 208, the segment header (e.g., L1 node 304 in the dynamically sized reverse map 208 as illustrated in FIG. 3) may be a higher level of node than the expanded node (e.g., L0 node 306 in the dynamically sized reverse map 208 as illustrated in FIG. 3) that stores the meta information of one or more expanded node. The information may include, but is not limited to, use count of the write blocks of the map segment. A write block may be a data grain or sector, which is the smallest unit a logical block can be reduced to. As an example, if the physical block size is 4096 bytes, then it can hold eight (8) 512 bytes reduced logical blocks. In some embodiments, the garbage collection module 210 may determine the use count of the write blocks of the map segment based on the information retrieved from the segment header. In further embodiments, the garbage collection module 210 may determine whether the map segment satisfies dynamically sized reverse map updating criteria based on the use count of the map segment. For example, assume that a map segment includes 8 write blocks, when there are pre-defined number (e.g., 6) of writes blocks are invalid, it determines that the map segment satisfies the dynamically sized reverse map updating criteria. It should be recognized that the above numbers are merely presented for the illustrative purpose and various numbers and different pre-defined dynamically sized reverse map updating criteria can be used.

If the garbage collection module 210 determines that the map segment satisfies the dynamically sized reverse map updating criteria, the garbage collection module 210 may perform dynamically sized reverse map updating process, e.g., garbage collection for the map segment. In further embodiments, the garbage collection module 210 may update information of the map segment in the segment header when the dynamically sized reverse map updating process is complete.

FIG. 3 is an example graphical representation illustrating a dynamically sized reverse map 208 layout as seen by the storage logic 104 according to the techniques described herein. As depicted in FIG. 3, the dynamically sized reverse map 208 may be a tree structure and the nodes of the tree may be implemented in the form of a radix tree. In the illustrated embodiments, the dynamically sized reverse map 208 may include L2 node 302, L1 node 304, L0 node 306, L0e map node 308, and L0 node buffer 310. It should be recognized that FIG. 3 as well as the other figures used to illustrate an embodiment, and an indication of a reference number or numeral, for example, "304" is a specific reference to the element or component that is designated by that particular reference numeral. In the event a reference numeral appears in the text following a multiple terminology, for example, "L1 nodes 304," it should be recognized that such is a general reference to different embodiments of the element or component bearing that general reference numeral.

The L2 node 302 shown in FIG. 3 is a root node or a parent node of the dynamically sized reverse map tree structure. In some embodiments, higher level of nodes than L2 node 302 can be utilized in the dynamically sized reverse map tree structure. It should be recognized that multiple L2 nodes 302 can be utilized. For the purpose of this application, the functionalities and operations performed associated with the dynamically sized reverse map 208 are described in the context of a single L2 node.

The L1 node 304 shown in FIG. 3 is a child node of the L2 node 302. In some embodiments, the L1 node 304 may store the information of a map segment, i.e. the L1 node is used as a segment header. A map segment may be a special segment(s) that stores a dynamic translation table 206 and a dynamically sized reverse map 208. In the dynamically sized reverse map tree structure, the segment header (e.g., L1 node 304 in the dynamically sized reverse map 208 as illustrated in FIG. 3) may be a higher level of node than the expanded node (e.g., L0 node 306 in the dynamically sized reverse map 208 as illustrated in FIG. 3) that stores information of the dynamically sized reverse map 208 node L0 306. The information may include, but is not limited to, use count of the write blocks of the map segment. A write block may be a data grain or sector, which is the smallest unit a logical block can be reduced to. As an example, if the physical block size is 4096 bytes, then it can hold eight (8) 512 bytes reduced logical blocks.

In the illustrated embodiment as depicted in FIG. 3, the leaf node of the dynamically sized reverse map 208 tree structure is called as the L0 node 306. In some embodiments, one L0 node 306 includes the mappings for the physical blocks of a segment. A segment herein may be fixed range of contiguous physical blocks on the storage devices 110 which are filled sequentially and erased together. It should be recognized that since the size of a segment is fixed, it may include fixed number of physical blocks. For example, assume that a segment is 32K bytes, and the physical block size is 4096 bytes, then the segment includes eight (8) physical blocks. In this case, one L0 node 306 includes the mappings for these eight (8) physical blocks in this segment.

In order to support the dynamic sizing of the L0 nodes 306 (and thus, the dynamic sizing of the entire reverse map), the dynamically sized reverse map 208 tree structure is extended to one more level, which shown as the L0e map node 308 in FIG. 3. The L0e map node 308 is also called L0 entry map node, and both names might be used interchangeable throughout the present disclosure. During in memory lookup, the radix tree search for a physical block will take it to the entry in the L0e map nodes 308. As depicted in FIG. 3, the L0e map node 308 includes a plurality of entries: entry 3080, entry 3081, entry 3082, and entry 3083. It should be recognized that although only 4 entries are shown in FIG. 3, other numbers of entries can be deployed and are within the scope of the present disclosure. In the illustrated embodiments, the entry 3083 is empty and will be filled in sequentially. In some embodiments, each of the entries is corresponding with one physical block. Therefore, the L0e map nodes 308 are fixed sized nodes and the number of entries is equal to the number of physical blocks in a segment. Using the same example described above, assume that a segment in the illustrated embodiment includes eight (8) physical blocks. Each entry of the L0e map nodes 308 has the mapping data for one of the eight (8) physical blocks. Therefore, the L0e map nodes 308 may have 8 entries. As shown in FIG. 3, these entries are filled in sequentially when the physical blocks that they represent are filled in sequentially. This feature enhances the locality for the dynamically sized reverse map 208 and is beneficial for the overall performance, especially the Garbage Collection operation on the storage device. Those skilled in the art will recognize that the segment size and the physical block size described above are merely used by way of example for illustration. Various other sizes for the segment and the physical blocks are contemplated as within the scope of the present disclosure.

Assume, the physical block size as illustrated in FIG. 3 is 4096 bytes just for description purpose only; and it should be recognized that various sizes of the physical blocks can be utilized. The Physical Block Number may be shortened as PBN, and the Logical Block Number may be shortened as LBN in FIG. 3 as well as in other figures.

As illustrated in FIG. 3, the size of each of the entries of L0e map nodes 308 is 32 bit with a format of <N: E>, wherein "N" is the number of mappings needed for this physical block, and "E" is the entry index of first mappings of this physical block in the L0 node 306. To be more specific, "N" represents number of mappings that are needed for one particular physical block that represented by this entry. The number of mappings that are needed for one particular physical block may be calculated based on the size of data block and the size of physical block. For instance, if an input data stream includes one or more data blocks each having the size of 1024 bytes after being compressed and prepares to store the one or more data blocks in physical block 0 (PBN=0); and if the size of physical block is 4096 bytes, then the dynamically sized reverse map 208 tree structure needs four (4) mappings for this physical block 0 when it stores this data stream. Those skilled in the art will recognize that the physical block size and the data block size described above are merely used by way of example for illustration. Various other sizes for the physical blocks and the data blocks (because of varying degrees of compression) are contemplated as within the scope of the present disclosure. As shown in FIG. 3, entry 3080 represents the physical block 0 and the "N" of this entry 3080 is four (4) based on the illustrated example. It should be recognized that the number of mappings needed for a physical block can be varied based on the size of the data blocks due to different amounts of compression that needed to be stored in the physical block. For instance, if the size of the data block that needs to be stored in physical block 1 is 2048 bytes, then the number of the mappings needed for this physical block 1 is two (2). As shown in FIG. 3, entry 3081 represents the physical block 1 and the "N" of this entry 3081 is two (2) based on the above example. It should also be recognized that the data blocks may have different sizes based on the compression ratio and the data blocks stored in the same physical block may have different sizes. In some embodiments, when the available space in one physical block is not enough for the next incoming data block, the system 100 may store the incoming data block across the physical block boundary.

As discussed above, the "E" in the <N: E> for an entry is the entry index of the first mappings in the L0 node 306. To be more specific, the "E" represents the relative starting location of mappings for one physical block in the L0 node 306. As known in the flash-storage industry, the physical blocks of the storage devices are filled sequentially. It is understandable that the first entry of the L0e map nodes 308, i.e. entry 3080 represents physical block number 0 of the segment and the starting location of mappings for physical block 0 is 0. Therefore, the entry index "E" of entry 3080 is "0". As discussed above, the number of mappings needed for the physical block 0 is 4, it means that the physical block 0 takes 4 mappings. Those 4 mappings start from 0, which are 0, 1, 2, and 3. Since the physical blocks of the storage devices are filled sequentially, the mappings for the next physical block 1 start from number 4. In the illustrated embodiment, the entry 3081 represents the physical block 1 in a segment. Therefore, the "E" of the entry 3081 is 4. As discussed above, the "N" of entry 3081 is 2, therefore those 2 mappings starts from 4, which are 4 and 5. Sequentially, the "E" of the next entry 3082 following the entry 3081 is 6. And, as shown in FIG. 3, the entry 3802 may consume 2 mappings, which should be 6 and 7. The next entry 3803 is empty and will be filled next. According to the previous analysis, the "E" of entry 3803 will be 8. It means the first mapping for physical block 3 will be having a starting location address of 8.

Referring back to the L0 node 306 in FIG. 3, which contains the mappings for physical blocks of a segment. As shown in FIG. 3, the L0 node 306 is made up by integral number of fixed-sized chunks called L0 node buffers 310. In some embodiments, these chunks are allocated on demand from a pre-allocated pool. This achieves the dynamic sizing of the L0 node 306, and thus, the dynamical sizing of the entire reverse map. These chunks are of the size of a write block, which is the minimal programmable unit of the storage media.

The L0 node buffer 310 includes a plurality of buffer entries: buffer entry 3100, buffer entry 3101, buffer entry 3102, buffer entry 3103, buffer entry 3104, buffer entry 3105, buffer entry 3106, buffer entry 3107, and buffer entry 3108, as shown in the FIG. 3. It should be recognized that although only 9 buffer entries are shown in FIG. 3, other numbers of entries can be deployed and are within the scope of the present disclosure. In the illustrated embodiments, the buffer entry 3108 is empty and will be filled in sequentially.

In some embodiments, each of the buffer entries is associated with one mapping for one data block. Therefore, it should be recognized that the number of mappings for one physical block is equal to the number of buffer entries that this physical block is represented by. For instance, as depicted in FIG. 3, the entry 3080 representing physical block number 0 is <4:0>, meaning it needs 4 mappings to represent physical block number 0; therefore, there are four (4) buffer entries are allocated for the physical block number 0, which are buffer entries 3100, 3101, 3102, and 3103.

As illustrated in FIG. 3, the buffer entry has a format of <L:P:S:N>, wherein the "L" is the Logical Block Number (LBN), the "P" is the Physical Block Number (PBN), the "S" represents the starting sector in the physical block, and "N" represents number of sectors in the physical block.

The "L" of the buffer entries represents the logical block number that the data block is stored in. In some embodiments, the logical block number is determined based on the information included in the write command.

The "P" of the buffer entries represents the physical block number that the data block is stored in. It should be recognized that for one particular physical block, the "P" should be the same across the buffer entries that it occupies. For instance, the physical block 0 has 4 mappings, which are buffer entries 3100, 3101, 3102, and 3103. All the "P" in these buffer entries should be the same, which is the PBN, i.e. zero (0). Similarly, the "P" in buffer entries 3104 and 3105 should be the same, which is the PBN, i.e., one (1).

The "S" of the buffer entries represents the starting sector in a physical block. As discussed above, each of the buffer entries represents one mapping. For instance, the first mapping of one physical block occupies the first integral numbers of sectors of the physical block, and the "S" for it should be zero (0). The second mapping of the same physical block starts from where the first mapping ends and the "S" for it may be determined based on the "S" and "N" of the first mapping of the physical block.

The "N" of the buffer entries represents number of sectors that this mapping consumes in the physical block. It should be recognized that the "N" for one mapping may be calculated based on the size of the compressed data block and the size of the sectors in this physical block. For instance, assume that a compressed data block having a size of 1024 bytes (which may be compressed prior to storage with a compression ratio of 4, for example, 4096 bytes to 1024 bytes), and the size of a sector is 512 bytes, then this compressed data block may consume two (2) sectors to store. It means the "N" in the mapping (buffer entry) for this data block is 2. In other embodiments, if the size of the incoming compressed data block (which may be compressed prior to storage with a compression ratio of 2, for example, 4096 bytes to 2048 bytes), and the size of a sector is 512 bytes, then this compressed data block may consume four (4) sectors to store. It should be recognized that the size of compressed data blocks that are stored in the same physical block may be different. In some embodiments, when the available space in one physical block is not enough for the next incoming data block, the system 100 may store the incoming data block across the physical block boundary. For example, for one physical block number 0, the incoming data stream including several (a first, second and third) compressed data blocks, which have respective sizes of 2048 bytes, 1024 bytes, and 2048 bytes. The first data block of 2048 bytes may consume four (4) sectors, and the mapping for it may be <L:P:0:4>, wherein the L represents logical block number and the P represents physical block number and they may be determined according to the above description. Here, the "S" for this first 2048 bytes of data block is zero (0) and the "N" for it is four (4) as discussed above. The second data block of 1024 bytes, may consume two (2) sectors, and the mapping for it may be P:4:2>, wherein the "S" for it is four (4), which means the starting sector for it is 4. It is understandable since the first data block already took 4 sectors, which are 0, 1, 2, and 3. The "N" for this second data block is two (2), which means that it consumes 2 sectors to store. As discussed above, the present disclosure allows different data blocks within the same physical block to have different sized physical space. Next, referring to the same example, the third data block in the incoming data stream is 2048 bytes, and it will take 4 sectors to store as discussed above. However, as discussed above, the size of a physical block is assumed as 4096 bytes, and the first two data blocks already consume 3072 bytes. This leaves 1024 bytes available in this physical block, which is not enough for this entire third data block. In some embodiment, the data blocks may be stored across the physical block boundary. Therefore, the mapping for the third data block may be <L P:6:4>, wherein the "S" is 6, and the "N" is 4. As discussed above, the available space in this physical block is not enough for the third data block; therefore, it takes 2 sectors from this physical block and 2 sectors from the next physical block to be stored. It should be recognized that the first mapping in the second physical block should reflect that the first 1024 bytes (2 sectors) of the second physical block is taken; thus, the first mapping should be <L P:2:N>. This means the first mapping in the second physical block starts from sector 2, which reflects that the first 2 sectors of this physical block have already been taken. It should be recognized that the above example is merely an example and is not shown in FIG. 3.

The techniques described herein are beneficial because it introduces a workload-based dynamically sized reverse map 208. As discussed above, with storage devices 110 supporting data reduction, one physical block can store multiple logical blocks in reduced form. Therefore, based on the different compression ratio, each physical block may need different numbers of mappings. Therefore, the L0 node 306, although each of them represents the same numbers of physical blocks, the size of L0 nodes 306 may be different from each other because they may include different numbers of L0 node buffers entries based on demand. Thus, the overall size of the dynamically sized reverse map 208 may be variable based on the workload.

Figure 4:
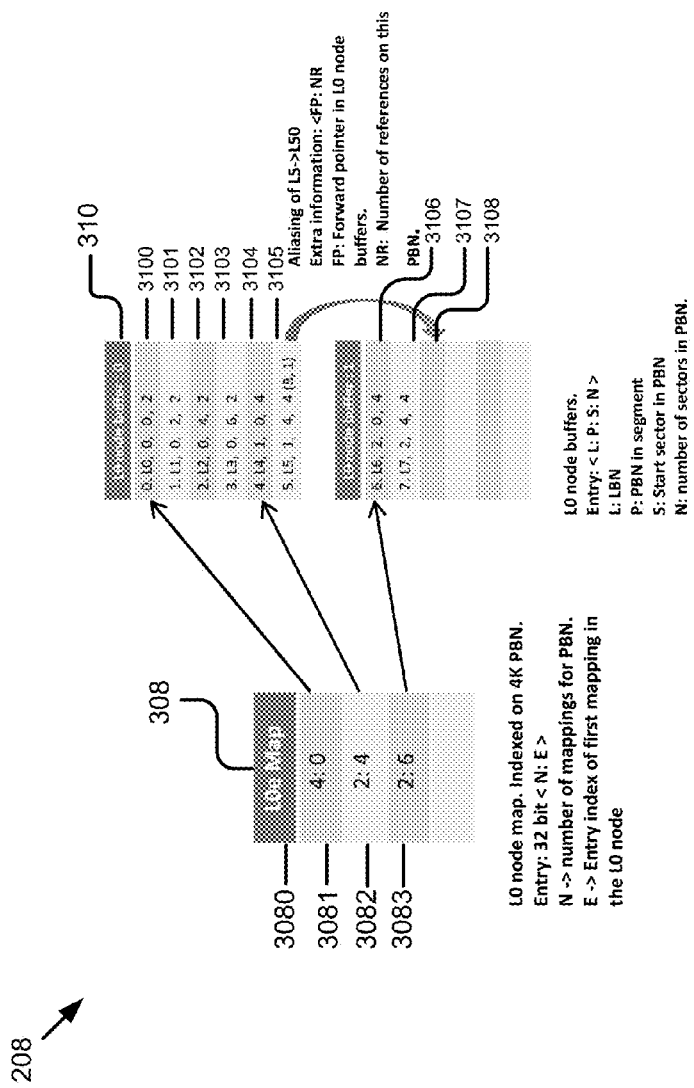
FIG. 4 is an example graphical representation illustrating a layout of the dynamically sized reverse map supporting block copy according to the techniques described herein.

FIG. 4 is an example graphical representation illustrating layout of the dynamically sized reverse map 208 supporting block copy according to the techniques described herein. Block copy is a mechanism to copy a range of logical blocks to another range of logical blocks. In order to support the block copy in this dynamically sized reverse map 208 implementation described herein, the variable size feature of the L0 nodes 306 can be beneficial. As discussed with reference to FIG. 3, the L0 node can be extended beyond the maximum number of mappings a segment can have. These new mappings can be used, after the block copy, for the new range of logical blocks that the physical block points to.

As depicted in FIG. 4, the L0 buffer node 310 may include integral number of buffer entries. When the system 100 receives a request to copy a plurality data blocks from a first range of logical address to a second range of logical address, the system 100 may update the dynamically sized reverse map 208 to indicate the block copy process. For instance, assume that the block copy request intends to copy data from logical block number 5 to logical block number 8, then the dynamically sized reverse map 208 may be updated to indicate the new mapping of from the physical blocks of the data to the logical block number 8. As depicted in FIG. 4, the buffer entry 3105 may be updated to include the extra information in a format of <FP: NR>, wherein the "FP" represents the forward pointer, and the "NR" represents the number of references. The block copy process is described in detail below with reference to FIG. 8.

Figure 5A:
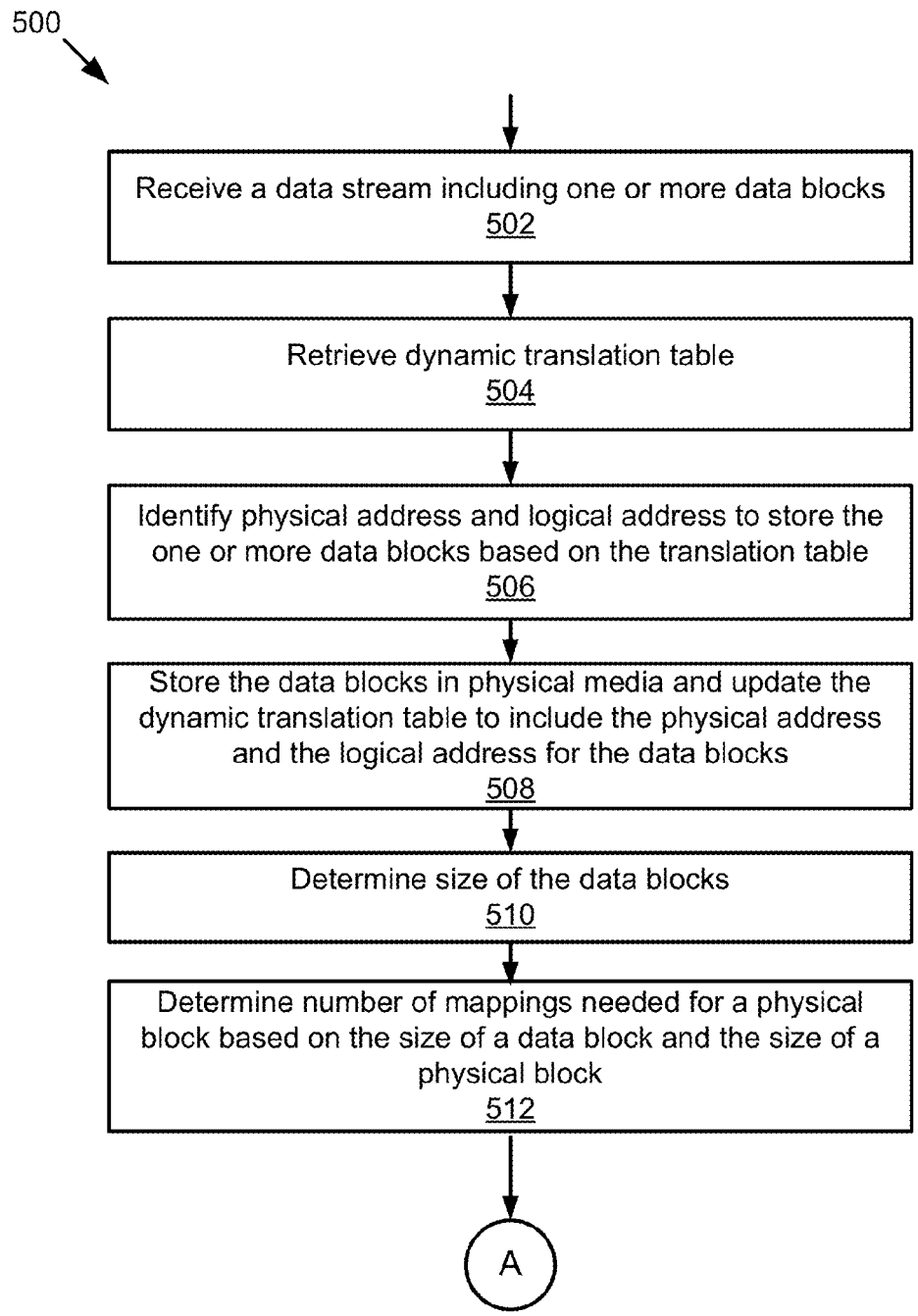
FIGS. 5A and 5B are flow charts of an example method for generating a dynamically sized reverse map for a write process to a storage device according to the techniques described herein.
Figure 5B:
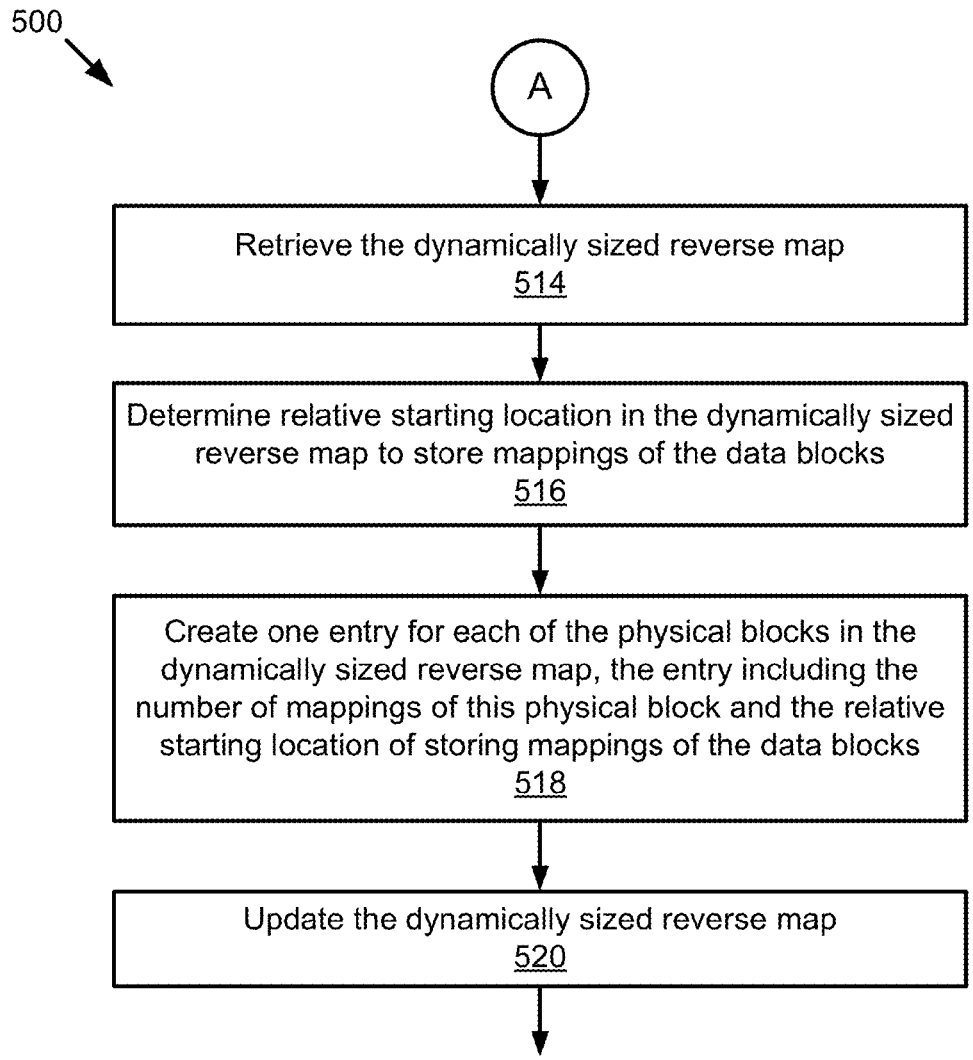

FIGS. 5A and 5B are flow charts of an example method 500 for generating a dynamically sized reverse map 208 for a write process to a storage device 110 according to the techniques described herein. The method 500 may begin by receiving 502 a data stream including one or more data blocks. In one embodiment, the data receiving module 202 receives a data stream (data packets) from one or more devices (not shown) and prepares them for storage in the storage devices 110. The incoming data may include, but is not limited to, a data stream and/or a command. The data stream may include a set of data blocks (e.g., current data blocks of a new data stream). In some embodiments, the data stream received by the data receiving module 202 is in compressed form. In other embodiments, the data stream received by the data receiving module 202 is transmitted to storage controller 204 to compress before storage process. In some embodiments, the operation performed in step 502 may be performed by the data receiving module 202 in cooperation with one or more other components of the system 100.

Next, the method 500 responsive to receiving a data stream in step 502 continues by, retrieving 504 the dynamic translation table 206. In one embodiment, the storage controller 204 retrieves the dynamic translation table 206 from the memory 212. In some embodiments, the storage controller 204 may compress the incoming data stream before storage process if needed.

Next, the method 500 may advance by identifying 506 the physical address and logical address to store the one or more data blocks of the received data stream based on the dynamic translation table 206. It should be recognized that the one or more data blocks of the received data stream may be compressed before the storage process. In one embodiment, the storage controller 204 identifies the physical address and the logical address to store the one or more data blocks.

The method 500 may then store 508 the data blocks in the storage devices 110 and update the dynamic translation table 206 to include physical address and logical address for the data blocks. In one embodiment, the storage controller 204 stores the data blocks in the storage devices 110 and updates the dynamic translation table 206 to include the mappings from logical address to physical address for the data blocks. In some embodiments, the storage controller 204 also stores the updated dynamic translation table 206 to the memory 212.

Next, the method 500 may advance by determining 510 the size of the data blocks. In one embodiment, the storage controller 204 determines the size of the data blocks. Referring back to FIG. 3, the size of the data block can be used to determine the number of mappings that are needed for one particular physical block. Also the size of the data block can be used to determine the number of sectors that each of buffer entries occupies in a physical block.

The method 500 may then determine 512 a number of mappings needed for a physical block based on the size of a data block (after compression) and the size of a physical block. It should be recognized that the size of the data block may be vary based on the compression ratio if it has been compressed. In one embodiment, the storage controller 204 determines the number of mappings needed for a physical block based on the size of a data block (or compressed size of a data block) and the size of a physical block. For instance, if an input data stream includes one or more data blocks having the size of 1024 bytes after compression (since the logical block size begins at 4096 bytes and is compressed to 1024 bytes) and prepared for storage in physical block 0 (PBN=0); and if the size of physical block is 4096 bytes, then the dynamically sized reverse map 208 tree structure needs four (4) mappings for this physical block 0 when it stores this data stream. It should be recognized that the number of mappings needed for a physical block is the "N" in the L0e map nodes 308 as illustrated in FIG. 3. It should be recognized that the data blocks may have different sizes based on the compression ratio and the data blocks stored in the same physical block may have different sizes. In some embodiments, when the avail space in one physical block is not enough for the next incoming data block, the system 100 may store the incoming data block across the physical block boundary.

The method 500 may then retrieve 514 the dynamically sized reverse map 208. In some embodiments, the dynamically sized reverse map 208 may be stored in the memory 212 and retrieved by the storage controller 204 when needed. It should be recognized that the dynamically sized reverse map 208 may be stored in other storage units as well, such as the storage devices 110. In some embodiments, the dynamically sized reverse map 208 is updated simultaneously with data store operations to keep track of the latest translation from physical address to logical address.

Next, the method 500 may advance by determining the relative starting location in the dynamically sized reverse map 208 to store mappings of the data blocks. In one embodiment, the storage controller 204 determines the relative starting location in the dynamically sized reverse map 208 to store the mappings of the data blocks. As discussed above with reference to FIG. 3, the relative starting location is the entry index "E" of entry in the L0e map nodes 308. Referring back to FIG. 3, the "E" represents the relative starting location of mappings for one physical block in the L0 node 306. As known in the flash-storage industry, the physical blocks of the storage devices are filled sequentially. It is understandable that the first entry of the L0e map nodes 308, i.e. entry 3080 represents physical block number 0 of the segment and the starting location of mappings for physical block 0 is 0. Therefore, the entry index "E" of entry 3080 is "0". As discussed above, the number of mappings needed for the physical block 0 is 4, it means that the physical block 0 takes 4 mappings. Those 4 mappings start from 0, which are 0, 1, 2, and 3. Since the physical blocks of the storage devices 110 are filled sequentially, the mappings for the next physical block 1 start from number 4. In the illustrated embodiment, the entry 3081 represents the physical block 1 in a segment. Therefore, the "E" of the entry 3081 is 4. As discussed above, the "N" of entry 3081 is 2, therefore those 2 mappings starts from 4, which are 4 and 5. Sequentially, the "E" of the next entry 3082 following the entry 3081 is 6. The entry 3803 is empty and will be filled next. According to the previous analysis, the "E" of entry 3803 will be 8. It means the first mapping for physical block 3 will be having a starting location address of 8. Again, it should also be recognized that the data blocks may have different sizes based on the compression ratio and the data blocks stored in the same physical block may have different sizes. In some embodiments, when the available space in one physical block is not enough for the next incoming data block, the system 100 may store the incoming data block across the physical block boundary.

Referring back to FIG. 5B, the method 500 may advance by creating one entry for each of the physical blocks in the dynamically sized reverse map 208, the entry including the number of mappings of this physical block and the relative starting location of storing mappings of the data blocks. In one embodiment, the storage controller 204 creates one entry for each of the physical blocks in the dynamically sized reverse map 208. The entry is created to include the number of mappings needed for this physical block and the relative starting location of first mapping for this physical block. In some embodiments, the entries are created and stored as L0e map nodes 308 as depicted in FIG. 3. Then the method 500 may update 520 the dynamically sized reverse map 208. In some embodiments, the storage controller 204 updates the dynamically sized reverse map 208 and stores the updated dynamically sized reverse map 208 in the memory 212.

Figure 6:
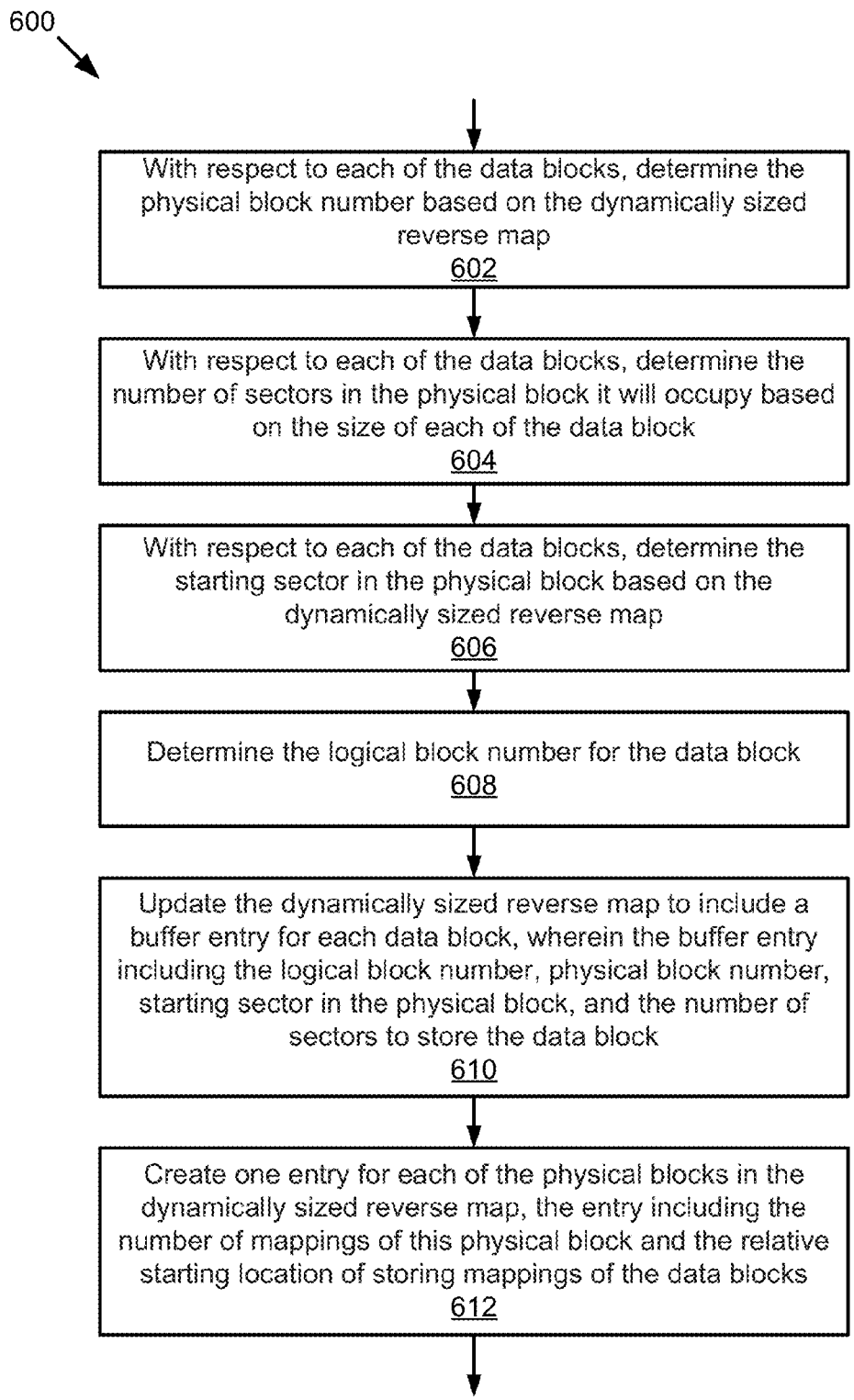
FIG. 6 is a flow chart of an example method of implementing a dynamically sized reverse map to include buffer entries for data blocks in a storage device according to the techniques described herein.

FIG. 6 is a flow chart of an example method 600 of implementing a dynamically sized reverse map 208 to include buffer entries for data blocks in a storage device 110 according to the techniques described herein. As discussed above, the dynamically sized reverse map 208 is a variable sized map. For each physical block, the dynamically sized reverse map 208 map have different numbers of buffer entries to store different numbers of mappings for that physical block. It should be recognized that the size of the data block may be vary based on the compression ratio if it has been compressed. Therefore, although the size of physical blocks is fixed, one physical block may store multiple logical blocks in compressed form. Thus, the size of the dynamically sized reverse map 208 can be variable based on the workload/number of logical blocks stored in storage devices 110. The detailed steps of building the buffer entries for data blocks are described with reference to FIG. 6 herein. The buffer entries are included in L0 nodes 306 as depicted in FIG. 3 with a format of <L:P:S:N>, wherein the "L" is the Logical Block Number (LBN), the "P" is the Physical Block Number (PBN), the "S" represents the starting sector in the physical block, and "N" represents number of sectors in the physical block.

The method 600 may begin by determining 602 the physical block number based on the dynamically sized reverse map 208 for each of the data blocks. As discussed above, when the system 100 receives a data stream including one or more data blocks, the system 100 stores the data blocks in the storage devices 110. The data stream may be received by the data receiving module 202 of the storage logic 104. In some embodiments, the storage controller 204 determines the physical block number for each of the data blocks based on the dynamically sized reverse map 208. As discussed above with reference to FIG. 3, the dynamically sized reverse map 208 may include the mapping information about the next available physical block number. The "P" of the buffer entries represents the physical block number that the data block is stored in. It should be recognized that for one particular physical block, the "P" should be the same across the buffer entries that it occupies. For instance, the physical block 0 has 4 mappings, which are buffer entries 3100, 3101, 3102, and 3103 as shown in FIG. 3. All the "P" in these buffer entries should be the same, which is the PBN, i.e. zero (0). Similarly, the "P" in buffer entries 3104 and 3105 should be the same, which is the PBN, i.e., one (1).

Referring back to FIG. 6, the method 600 may continue by determining 604, with respect to each of the data blocks, the number of sectors in the physical block it will occupy based on the size of each of the data block. It should be recognized that the size of data block may vary based on the compression ratio if it has been compressed. As discussed above with reference to FIG. 3, the "N" of the buffer entries represents number of sectors that this data block consumes in the physical block. In some embodiments, the storage controller 204 calculates the "N" based on the size of the compressed data block that this physical block stores and the size of sectors in this physical block. For instance, assume that a compressed data block having a size of 1024 bytes (which may be compressed prior to storage with a compression ratio of 4, for example, 4096 bytes to 1024 bytes), and the size of a sector is 512 bytes, then this compressed data block may consume two (2) sectors to store. This means the "N" in the mapping (buffer entry) for this data block is 2. In other embodiments, if the size of the incoming compressed data block (which may be compressed prior to storage with a compression ratio of 2, for example), and the size of a sector is 512 bytes, then this compressed data block may consume four (4) sectors to store. It should be recognized that the size of compressed data blocks that are stored in the same physical block may be different. In some embodiments, when the available space in one physical block is not enough for the next incoming data block, the system 100 may store the incoming data block across the physical block boundary.

Referring back to FIG. 6, the method 600 may advance by determining 606, with respect to each of the data blocks, the starting sector in the physical block based on the dynamically sized reverse map 208. The starting sector in a physical block is represented by the "S" of the buffer entries. As discussed above with reference to FIG. 3, each of the buffer entries represents one mapping. For instance, the first mapping/buffer entry of one physical block occupies the first integral numbers of sectors of the physical block, and the "S" for it should be zero (0). The second mapping/buffer entry of the same physical block starts from where the first mapping ends and the "S" for it may be determined based on the "S" and "N" of the first mapping/buffer entry of the physical block.

Next, the method 600 may continue by determining 608 the logical block number for the data block. In some embodiments, the storage controller 204 may deduce the logical block number for the data block based on the write command. As depicted in FIG. 3, the logical block number is represented by "L" for the buffer entry.

The method 600 may continue by updating 610 the dynamically sized reverse map 208 to include a buffer entry for each of the data block, wherein the buffer entry including the logical block number (L), the physical block number (P), the starting sector in the physical block (S), and the number of sectors (N) needed to store the data block. In some embodiments, the storage controller 204 may update the dynamically sized reverse map 208 and then store the updated dynamically sized reverse map 208 in the memory 212, and the method 600 may end.

Figure 7:
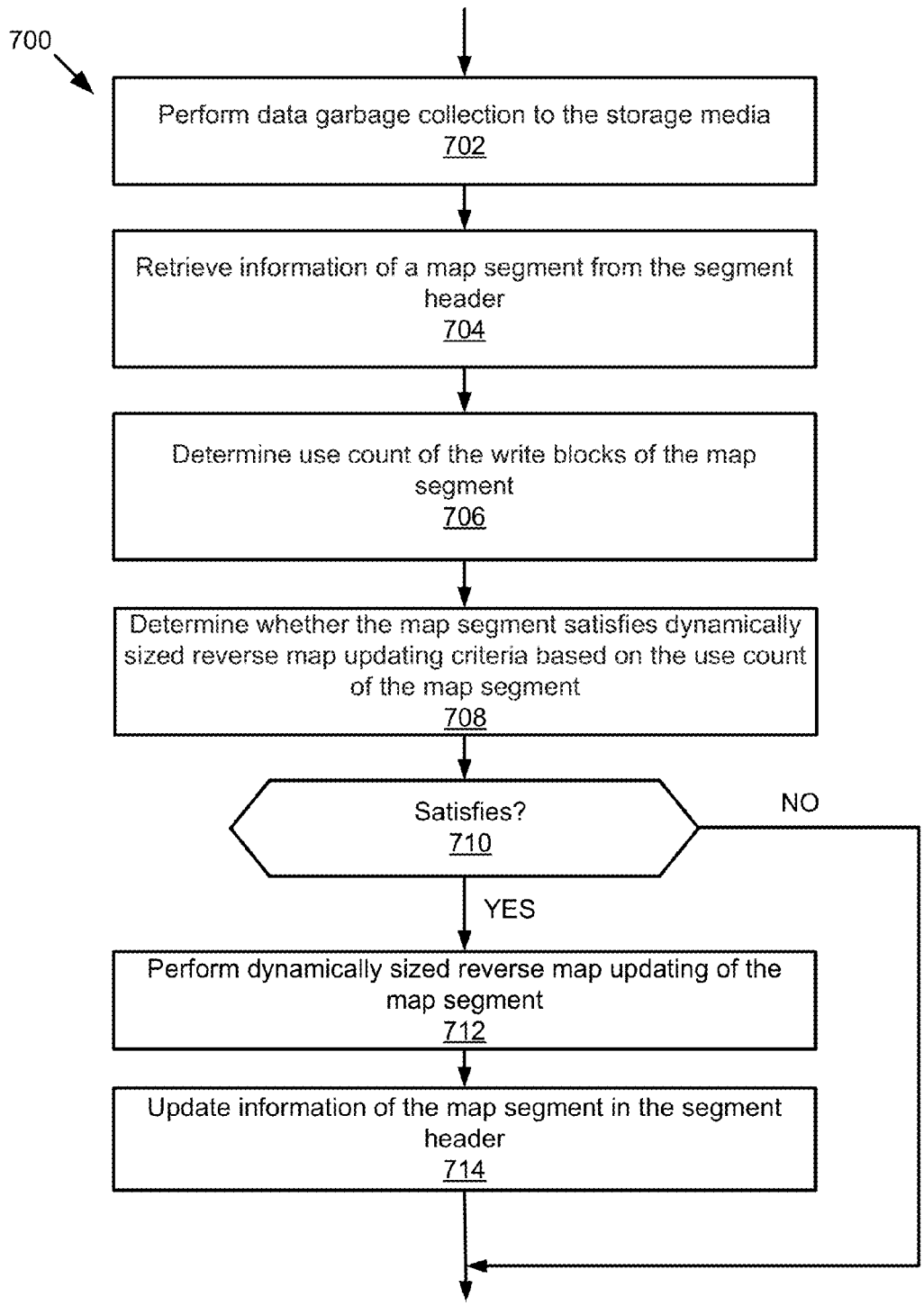
FIG. 7 is a flow chart of an example method of implementing a garbage collection operation for a dynamically sized reverse map in a storage device according to the techniques described herein.

FIG. 7 is a flow chart of an example method 700 of implementing a garbage collection operation for a dynamically sized reverse map 208 in a storage device 110 according to the techniques described herein. After a physical block is reclaimed by the garbage collection process, it will be used by a new logical block. This will give rise to a new reverse mapping, which makes the older reverse mapping of this physical block invalid. Overtime such invalid mappings get accumulated in the storage devices 110. The space consumed by these invalid mappings is reclaimed by the dynamically sized reverse map updating process, e.g., garbage collection for the dynamically sized reverse map 208. The garbage collection for the dynamically sized reverse map 208 works on a segment at a time and it selects the best segment for garbage collection based at least on the amount of invalid data present in the segment. With variable sized L0 nodes 306, the dynamically sized reverse map 208 needs to keep account of the space consumed by an L0 node in a segment. As discussed above, an L0 node 306 is made up by integral number of write blocks. Thus, the invalid space in a segment is counted in units of write blocks.

The method 700 may begin by performing 702 data garbage collection on the storage devices 110. In some embodiments, the garbage collection module 210 performs the data garbage collection periodically to the storage devices 110 of the system 100. It should be recognized that garbage collection is a form of automatic memory management that finds data objects in a program that cannot be accessed in the future, and to reclaim the resources used by those objects.

Next, the method 700 may then continue by retrieving 704 information of a map segment from the segment header. In some embodiments, the storage controller 204 may retrieve the information of a map segment from the segment header responsive to the completion of the data garbage collection. For the illustrated purpose only, it should be understood that a segment is a fixed range of contiguous physical blocks on the storage devices 110 which are filled sequentially and erased together. A map segment may be a special segment(s) stores dynamic translation 206 and the dynamically sized reverse map 208. In the tree structure of the dynamically sized reverse map 208, the segment header (e.g., the L1 node 304 in the dynamically sized reverse map 208 as illustrated in FIG. 3) may be a higher level of node than the expanded nodes (e.g., L0 node 306 in the dynamically sized reverse map 208 as illustrated in FIG. 3). The information of the map segment is stored in the L0 node header, which is the L1 node 304 as depicted in the tree structure of the dynamically sized reverse map 208 in FIG. 3. The L1 node 304 stores the information about number of write blocks constituting an L0 node 306 on the storage devices 110, and the address of the segment in which this L0 node 306 is written. When an L0 node 306 is written to the storage devices 110, the old segment address and the number of write blocks are fetched from the L1 node 304. The number of invalid write blocks (use count) in the old segment is incremented by number of write blocks this L0 node 306 has consumed.

Referring back to FIG. 7, the method 700 may continue by determining 706 use count of the write blocks of the map segment. A write block may be a data grain or sector, which is the smallest unit a logical block can be reduced to. As an example, if the physical block size is 4096 bytes, then it can hold eight (8) 512 bytes reduced logical blocks. In some embodiments, the garbage collection module 210 may determine the use count of the write blocks of the map segment based on the information retrieved from the segment header. The operation performed in step 706 may be performed by the storage controller 204 in cooperation with one or more other components of the system 100.

Next, the method 700 may advance by determining 708 whether the map segment satisfies the dynamically sized reverse map updating criteria based on the use count of the map segment. In some embodiments, the garbage collection module 210 may determine whether the map segment satisfies the dynamically sized reverse map updating criteria based on the use count of the map segment. For instance, the dynamically sized reverse map updating criteria may be predefined as comparing the use count against a threshold. This process is described by step 710 of the method 700. Such as, if use count of the map segment is incremented to be 36 and the threshold is preset as 30, then the garbage collection module 210 determines that this map segment satisfies the dynamically sized reverse map updating criteria. In another embodiment, if use count of the map segment is 26 and the threshold is preset as 30, then the garbage collection module 210 determines that this map segment does not satisfy the dynamically sized reverse map updating criteria. As depicted in FIG. 7, the method 700 may end responsive to the determination that a map segment does not satisfy the dynamically sized reverse map updating criteria.

Next, the method 700 may then responsive to the determination that a map segment satisfies the dynamically sized reverse map updating criteria, continue by performing 712 dynamically sized reverse map updating process of the map segment. In some embodiments, the garbage collection module 210 may perform the dynamically sized reverse map updating process, e.g., garbage collection to the dynamically sized reverse map 208. The operation performed in step 712 may be performed by the storage controller 204 in cooperation with one or more other components of the system 100.

Next, the method 700 may continue by updating 714 the information of the map segment in the segment header. In some embodiments, the garbage collection module 210 may update the information of the map segment in the segment header. In the illustrated embodiment, the use count of the map segment is reset after the garbage collection process to the map segment. The information of the map segment may be stored in the map segment header, e.g., L1 node 304 as depicted in FIG. 3. After the information of the map segment is updated, the method 700 may end.

Figure 8:
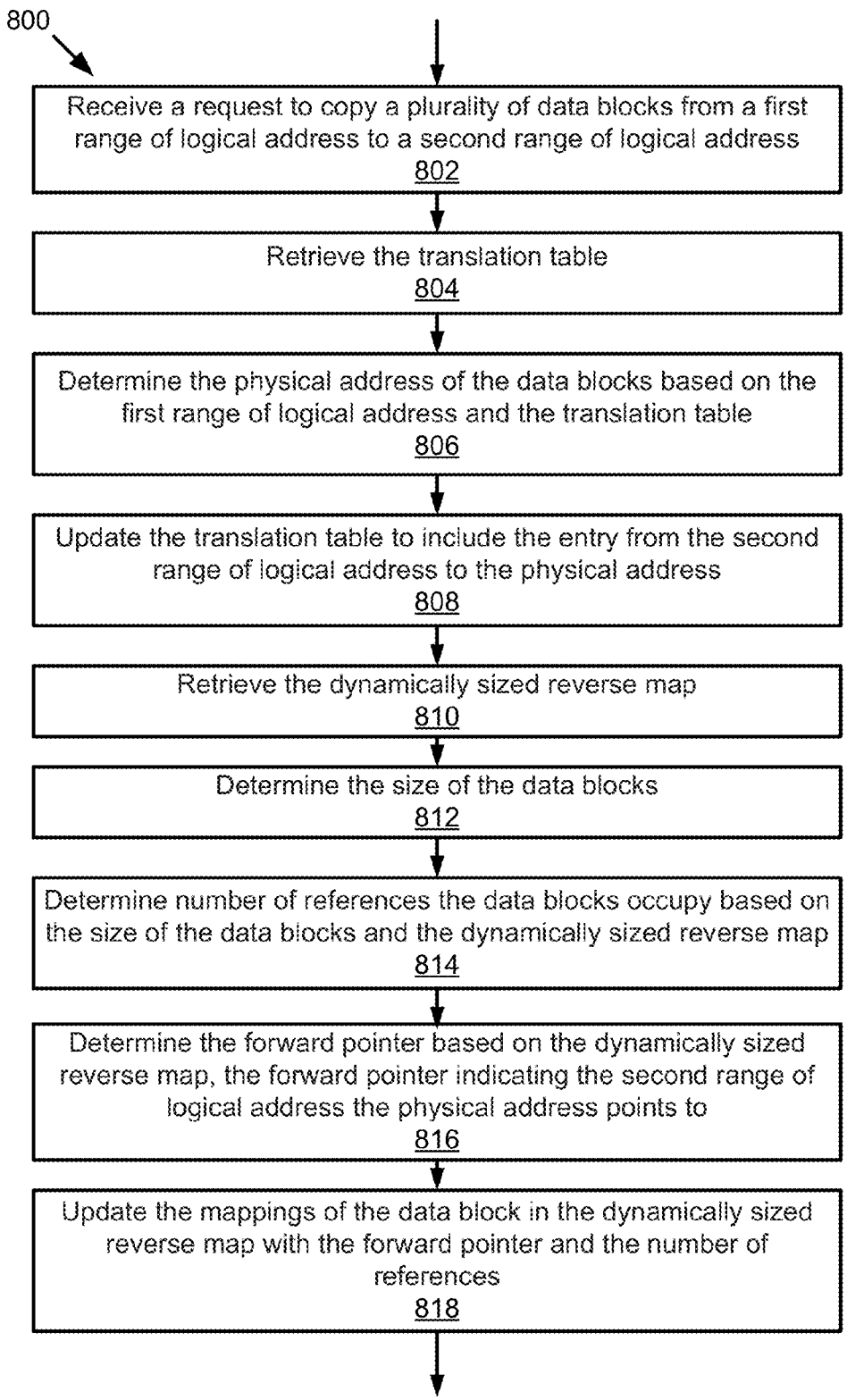
FIG. 8 is a flow chart of an example method of implementing a dynamically sized reverse map for a block copy process in a storage device according to the techniques described herein.

FIG. 8 is a flow chart of an example method 800 of implementing a dynamically sized reverse map 208 for a block copy process in a storage device 110 according to the techniques described herein. The method 800 may begin by receiving 802 a request to copy a plurality of data blocks from a first range of logical address to a second range of logical address. In one embodiment, the data receiving module 202 may receive the request to copy a plurality of data blocks from a first range of logical address to a second range of logical address. The request may include, but not limited to, information about the first range of logical address, information about second range of logical address, and information of the data blocks.

Next, the method 800 may continue by retrieving 804 the dynamic translation table 206. In some embodiments, the storage controller 204 may retrieve the dynamic translation table 206.

Next, the method 800 may advance by determining 806 the physical address of the data blocks based on the first range of logical address and the translation table. In some embodiments, the storage controller 204 may determine the physical address of the data blocks based on the first range of logical address and the dynamic translation table 206.

Next, the method 800 may continue by updating 808 the dynamic translation table 206 to include the entry from the second range of logical address to the physical address. In some embodiments, the storage controller 204 may update the dynamic translation table 206 to include the entry from the second range of logical address to the physical address. By the operation performed in step 808, the second range of logical address points to the physical address that stores the plurality of data blocks.

Next, the method 800 may continue by retrieving 810 the dynamically sized reverse map 208.

The method 800 may continue by determining 812 the size of the data blocks. In some embodiment, the storage controller 204 may determine the size of the data block based on the request of copying a plurality of data blocks from a first range of logical address to a second logical address. The request may include the information of the data blocks.

Next, the method 800 may advance by determining 814 the number of references the data blocks occupy based on the size of the data blocks and the dynamically sized reverse map 208. As discussed above with reference to FIG. 4, the number of references may be determined based on the size of the data blocks and the dynamically sized reverse map 208. The buffer entry 3105 is copy to the buffer entry 3108 and the number of reference is "1".

The method 800 may advance by determining 816 the forward pointer based on the dynamically sized reverse map 208, the forward pointer indicating the second range of logical address that the physical address points to. As depicted in FIG. 4, when copying data blocks from the first range of logical address (e.g., logical block number 5 as shown in the buffer entry 3105) to the second range of logical address (e.g., logical block number 8 as shown in the buffer entry 3108), the forward pointer (FP) is determined to be 8.

The method 800 may advance by updating 818 the mappings of the data block in the dynamically sized reverse map 208 with the forward pointer and the number of references. As illustrated in FIG. 4, the buffer entry 3105 may be updated to include the <FP: NR> information, wherein the "FP" represents the forward pointer and the "NR" represents the number of references. The method 800 may end after updating the mapping of the data block in the dynamically sized reverse map 208.

Systems and methods for implementing a dynamically sized reverse map in a storage device are described below. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one embodiment", "some embodiments" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
   receiving a data stream including one or more data blocks;
   determining a size of the one or more data blocks;
   determining a number of mappings based on the size of the one or more data blocks and a size of a physical block, the number of mappings being variable for different physical blocks depending on the size of the one or more data blocks stored in the physical block;
   retrieving a dynamically sized reverse map, a size of the dynamically sized reverse map corresponding to the variable number of mappings for different physical blocks;
   determining a starting location in the dynamically sized reverse map for mappings of the one or more data blocks; and
   creating an entry for the physical block in the dynamically sized reverse map, the entry including the number of mappings of the physical block and the starting location for the one or more data blocks, the entry being an index of the numbers of mappings for the physical block.

2. The method of claim 1, wherein dynamically sized reverse map includes a dynamic tree structure having an extensible node for a plurality of buffer entries, one buffer entry for each of the one or more data blocks.

3. The method of claim 1, further comprising creating, a buffer entry for each of the one or more data blocks, the buffer entry including a logical block number, a physical block number, a starting sector in the physical block, and a number of sectors occupied in the physical block.

4. The method of claim 3, wherein the buffer entry is persisted to a storage device.

5. The method of claim 4, wherein the number of mappings of the physical block represents a number of buffer entries a physical block consumes.

6. The method of claim 3, wherein the number of sectors occupied in the physical block is determined based on the size of each of the one or more data blocks and a size of the sectors.

7. The method of claim 1, further comprising:
   receiving a request to copy a plurality of data blocks from a first range of logical address to a second range of logical address;
   determining a size of the plurality of data blocks;
   determining number of references the plurality of data blocks occupy based on the size of the plurality of data blocks;
   determining a forward pointer based on the dynamically sized reverse map for the plurality of data blocks; and
   updating the dynamically sized reverse map with an extra entry with the forward pointer and the number of references.

8. The method of claim 1, further comprising:
   retrieving information of a map segment from a segment header;
   determining a use count of write blocks of the map segment;
   determining whether the map segment satisfies dynamically sized reverse map updating criteria based on the use count of the map segment;
   responsive to the map segment satisfying the dynamically sized reverse map updating criteria, performing dynamically sized reverse map updating on the map segment; and
   updating the information of the map segment in the segment header.

9. The method of claim 8, wherein the map segment stores the dynamically sized reverse map.

10. A system comprising:
    a dynamically sized reverse map having a variable size corresponding to a variable number of mappings for different physical blocks of a storage device; and
    a processor coupled to the dynamically sized reverse map, the processor configured to:
      receive a data stream including one or more data blocks;
      determine a size of the one or more data blocks;
      determine a number of mappings needed for a physical block based on the size of a data block and a size of the physical block, the number of mappings being variable for different physical blocks depending on the size of the one or more data blocks storing in the physical block;
      determine a starting location in the dynamically sized reverse map for mappings of the one or more data blocks; and
      create an entry for the physical block in the dynamically sized reverse map, the entry including the number of mappings of the physical block and the starting location for the one or more data blocks, the entry being an index of the variable numbers of mappings for the physical block.

11. The system of claim 10, wherein the dynamically sized reverse map includes a dynamic tree structure having an extensible node for a plurality of buffer entries, one buffer entry for each of the one or more data blocks.

12. The system of claim 11, wherein the extensible node includes buffer entry for each of the one or more data blocks, the buffer entry including a logical block number, a physical block number, a starting sector in the physical block, and a number of sectors occupied in the physical block.

13. The system of claim 12, wherein the processor is configured to persist the buffer entry to a storage device.

14. The system of claim 13, wherein the number of mappings of the physical block represents a number of buffer entries a physical block consumes.

15. The system of claim 12, wherein the number of sectors occupied in the physical block is determined based on the size of each of the one or more data blocks and a size of the sectors.

16. The system of claim 10, wherein the processor is further configured to:
- receive a request to copy a plurality of data blocks from a first range of logical address to a second range of logical address;
- determine a size of the plurality of data blocks;
- determine number of references the plurality of data blocks occupy based on the size of the plurality of data blocks;
- determine a forward pointer based on the dynamically sized reverse map for the plurality of data blocks; and
- update the dynamically sized reverse map with an extra entry with the forward pointer and the number of references.

17. The system of claim 10, wherein the processor is further configured to:
- retrieve information of a map segment from a segment header;
- determine a use count of write blocks of the map segment;
- determine whether the map segment satisfies dynamically sized reverse map updating criteria based on the use count of the map segment;
- responsive to the map segment satisfying the dynamically sized reverse map updating criteria, perform dynamically sized reverse map updating on the map segment; and
- updating the information of the map segment in the segment header.

18. The system of claim 17, wherein the map segment stores the dynamically sized reverse map.

* * * * *